United States Patent
Arai et al.

(10) Patent No.: US 7,109,420 B2
(45) Date of Patent: Sep. 19, 2006

(54) HARNESS PROTECTOR AND METHOD FOR PRODUCING THE SAME

(75) Inventors: Hiroaki Arai, Shizuoka (JP); Toshiyuki Tsutsumi, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/913,493

(22) Filed: Aug. 9, 2004

(65) Prior Publication Data

US 2005/0045361 A1    Mar. 3, 2005

(30) Foreign Application Priority Data

Aug. 7, 2003    (JP)    ............... 2003-289201

(51) Int. Cl.
*H02G 3/04*    (2006.01)

(52) U.S. Cl. ............... 174/72 A; 174/481; 174/68.1; 174/97; 174/99 R

(58) Field of Classification Search ............... 174/48, 174/72 A, 68.1, 68.3, 96, 97, 98, 99 R, 100, 174/101, 480, 481
See application file for complete search history.

(56) References Cited

U.S. PATENT DOCUMENTS

| | | | | |
|---|---|---|---|---|
| 4,864,082 A | * | 9/1989 | Ono et al. | 174/97 |
| 4,891,471 A | * | 1/1990 | Ono et al. | 174/68.3 |
| 4,951,716 A | * | 8/1990 | Tsunoda et al. | 138/162 |
| 5,115,260 A | * | 5/1992 | Hayward et al. | 174/72 A |
| 5,161,580 A | * | 11/1992 | Klug | 138/92 |
| 5,332,866 A | * | 7/1994 | Sawamura | 174/101 |
| 5,399,812 A | * | 3/1995 | Woszczyna et al. | 174/97 |
| 5,401,905 A | * | 3/1995 | Lesser et al. | 174/99 R |
| 5,597,980 A | * | 1/1997 | Weber | 174/72 A |
| 5,709,249 A | * | 1/1998 | Okada et al. | 138/162 |
| 5,777,270 A | * | 7/1998 | West et al. | 174/99 B |
| 5,929,380 A | * | 7/1999 | Carlson et al. | 174/68.3 |
| 6,049,040 A | * | 4/2000 | Biles et al. | 174/68.3 |
| 6,051,790 A | * | 4/2000 | Takeuchi et al. | 174/72 A |
| 6,344,611 B1 | * | 2/2002 | Ewer et al. | 174/48 |
| 6,444,903 B1 | * | 9/2002 | Saeki et al. | 174/48 |
| 6,528,728 B1 | * | 3/2003 | Shima | 174/101 |
| 6,756,544 B1 | * | 6/2004 | Handler | 174/68.1 |
| 6,861,589 B1 | * | 3/2005 | Katsumata et al. | 174/68.3 |

FOREIGN PATENT DOCUMENTS

| | | |
|---|---|---|
| JP | 63-198324 U | 12/1988 |
| JP | 3-34280 A | 2/1991 |
| JP | 11-8922 A | 1/1999 |

* cited by examiner

*Primary Examiner*—William H. Mayo
*Assistant Examiner*—Adolfo Nino
(74) *Attorney, Agent, or Firm*—Sughrue Mion, PLLC

(57) ABSTRACT

A harness protector includes a first protector formed by injection-molding and a second protector formed by extrusion-molding. The second protector is fitted with the first protector. The first protector and the second protector are connected each other.

18 Claims, 7 Drawing Sheets

HARNESS PROTECTOR AND METHOD FOR PRODUCING THE SAME

BACKGROUND OF THE INVENTION

This invention relates to a harness protector which is mounted on a required portion of a wire harness (installed, for example, along a vehicle body panel) so as to prevent the wire harness from damage due to external interference and so on and a method for producing the harness protector.

FIGS. 7 and 8 show examples of related harness protectors of this kind, respectively (for example, JP-UM-A-63-198324 (Pages 3 to 6, FIG. 1) and JP-A-3-34280 (Pages 2 to 4, FIG. 1)).

The first related example, shown in FIG. 7, is designed to prevent a wire harness from being lifted or projecting from a protector body 41. Lock portions 47 are formed respectively on partition walls 46 formed upright on a base wall 42 of the protector body 41, and openable/closable wire holder members 49 are provided at side walls 43a and 43b of the protector body 41, and are disposed in corresponding relation to their mating partition walls 46, each of the wire holder members 49 having retaining holes 50 for retaining engagement respectively with the corresponding lock portions 47.

The harness protector 40 includes the protector body 41 of a U-shaped cross-section for mounting on the wire harness, and a protector cover (not shown) which is separate from the protector body 41. The protector body 41 includes the base wall 42, and the opposite side (outer) walls 43a and 43b, and this protector body is formed into a three-dimensionally curved configuration. The partition walls 46 are formed upright on the base wall 42 of the protector body 41. The partition walls 46 are upstanding in substantially parallel relation to the two outer walls 43a and 43b, and divide the transverse cross-section of the protector body into a plurality of spaces 48.

The lock portions 47 are formed respectively at distal ends of the partition walls 46, and can be engaged respectively in the retaining holes 50 formed in the wire holder portions 49. Each wire holder portion 49 is connected at one end to the side wall 43a of the protector body 41 through a hinge 51, and the other end thereof can be retainingly engaged with the side wall 43b of the protector body 41 by retaining means. The protector cover is formed into a shape corresponding to the shape of an open side of the protector body 41, and can be locked to the side walls 43a and 43b of the protector body 41 by retaining means.

A condition in which the protector 40 is used will be described. The wire harness is divided into constituent wires, and these wires are passed respectively through the spaces separated from each other by the partition walls 46 of the protector body 41. Thanks to the provision of the partition walls 46, the wire harness is passed uniformly through the interior of the protector body 41, and therefore will not be laterally localized at one region. After the passage of the wire harness, the wire holder members 49 are engaged with the lock portions 47 formed respectively at the distal ends of the partition walls 46, so that the wire harness is fixed so as not to project from the interior of the protector body 41 to the exterior. Finally, the open side of the protector body 41 is closed by the protector cover.

The second related example, shown in FIG. 8, provides the blow-molded harness protector 60 which enhances the efficiency of a wire harness-inserting operation, and prevents a wire harness of a large diameter from damage, and besides has a small number of component parts, and therefore is excellent in economy. A wire harness-inserting slit 62 is formed through one side wall 61, and holes 63 for the insertion of a wire harness-inserting jig therethrough are formed through that side wall facing the slit 62.

The harness protector 60 is made of a synthetic resin such as polyethylene and polypropylene. The slit 62 is formed through the side wall, and extends longitudinally over the entire length thereof. The side wall 61 of the harness protector 60 is thin, and therefore has flexibility. Therefore, when the slit 62 is expanded, the wire harness can be inserted therethrough. When the wire harness is thus inserted, the slit 62 is closed because of an elastic restoring force of the side wall 61, so that the wire harness is prevented from withdrawal from the harness protector 60, thereby protecting the wire harness from external interference and so on.

The holes 63 are formed through the wall by simple technique such as punching or a heating iron. The wire harness-inserting jig is inserted through the hole 63, and a rod-like portion, formed at a distal end of the jig, is engaged in the slit 62, and expands the slit 62 wide open. After the wire harness is inserted through the widened slit, the jig is removed, so that the slit 62 is closed.

However, the above first and second related harness protectors 40 and 60 have the following problems to be solved.

The first related example is the injection-molded harness protector 40 of a curved structure, and the wire holder members 49 are formed at the side wall 43a so as to fix the wire harness. The cost for a mold was high, and the facilities increased, and therefore there was encountered a problem that the length of the harness protector 40 could not be easily changed.

In the second example, only the molded product of a simple shape with a uniform cross-section could be obtained, and there was encountered a problem that any wall for preventing the fluttering and movement of the wire harness within the harness protector 60, as well as any mounting bracket for fixing to a vehicle body could not be formed by molding. Namely, a wire fixing structure and a protector mounting structure could not be incorporated in the harness protector 60, which invited a problem that that portion of the wire harness, required to be protected, could not be properly protected.

And besides, the harness protector 60 is cut from a blow-molded product extending long in the longitudinal direction, and a sharp edge is formed at a cut portion, and also burrs are formed at the cut portion. Therefore, there was a fear that the wire rubbed against the sharp edge or the like to be damaged, so that the reliability of electrical connection could be adversely affected.

Blow molding is a molding method in which a molten resin, is extruded into a tubular shape, and is held in a mold, and the air is blown inside the extruded resin, and then the resin is cooled and solidified. Therefore, similarly with an extrusion method, the molded product could not be formed into a complicated two- or three-dimensionally curved shape, and there was encountered a problem that the molded product could not effectively protect a curved wire harness installed along a vehicle body panel or the like.

SUMMARY OF THE INVENTION

In view of the foregoing, it is an object of this invention to provide a harness protector of an interconnecting structure which can be easily changed in longitudinal dimension, and can effectively protect a wire harness of a required length from external interference and so on, and also can prevent damage of the wire harness.

The above object has been achieved by a harness protector, comprising:

a first protector formed by injection-molding; and a second protector formed by extrusion-molding, which is fitted with the first protector, wherein the first protector and the second protector are connected each other.

In this construction, a wire fixing portion and a vehicle body-side fixing portion can be provided at the first injected-molded connector, and the fixing of a wire and the mounting of the harness protector on the vehicle body can be effected. And besides, the first protector can be molded into a curved configuration corresponding to the shape of installation of the wire. The second extrusion-molded protector functions as a connecting member for connection to the first protector, and the second protector, cut into an arbitrary length, is connected to the first protector, and by doing so, there can be provided the harness protector suited for the length of the wire harness. The number of the first and second connectors to be connected together is not limited, and for example two connectors, that is, the first connector and the second connector, can be connected together, or the second connectors can be connected to opposite ends of the first connector, respectively.

Preferably, the first protector has a retaining portion. The second protector has an engagement portion for engagement with the retaining portion.

In this construction, the two protectors, connected together, are prevented from being accidentally disengaged from each other by vibrations and an impact during the travel of the vehicle.

Preferably, the retaining portion is a retaining projection. The engagement portion is a hole.

In this construction, the moldability of the second protector which is an extruded member is enhanced, and besides the hole, serving as the engagement portion, can be formed with a simple method.

Preferably, the first protector includes a base member and a cover member which is detachably attached to the base member.

In this construction, before installing the wire harness, the wire harness does not need to be beforehand passed through the first protector, and besides after the installation of the wire harness, the first protector can be easily mounted on the wire harness.

Preferably, a support wall which supports a wire harness so that the wire harness is spaced from a wall portion of the base member is formed on the wall portion. A height of the support wall is generally equal to or greater than a wall thickness of the second protector.

In this construction, even when a cut portion of the second connector has a sharp edge, this sharp edge is prevented from contacting the wire harness.

Preferably, a wire fixing portion which holds a wire harness arranged on the base member is formed on a wall portion of the cover member.

In this construction, when the cover is fitted on the base, the wire harness, passed through the base, is held by the wire fixing portion of the cover.

Preferably, a vehicle body mounting portion for fixing to a vehicle body is provided on the first protector.

In this construction, the wire harness can be fixed to the vehicle body-side (such as a vehicle body panel) against movement, and besides the production of abnormal sounds due to fluttering of the wire harness can be prevented.

Preferably, the first protector has a first containing portion in which a wire harness is passed through. Te second protector has a second containing portion in which the wire harness is passed through. When the first protector and the second protector is connected together, the first containing portion and the second containing portion are communicated each other.

According to the present invention, there is also provided a method for assembling a harness protector, comprising the steps of:

forming a first protector by injection-molding;

forming a second protector by extrusion-molding; and connecting the first protector and the second protector each other in a state that the second protector is fitted with the first protector.

Preferably, a support wall which supports a wire harness so that the wire harness is spaced from a wall portion of the base member is formed on the wall portion. A height of the support wall is generally equal to or greater than a wall thickness of the second protector.

As described above, the wire fixing portion and the vehicle body mounting portion can be provided at the first injected-molded connector, and the fixing of the wire and the mounting of the harness protector can be effected. And besides, the first protector can be molded into a curved configuration corresponding to the shape of installation of the wire. The second extrusion-molded protector is formed into a pipe-like member of a uniform cross-section, and therefore can be cut into an arbitrary length. By changing the length of the second protector serving as the connecting member, the length of the harness protector can be changed (increased and decreased). Therefore, the freedom of design of the harness protector is enhanced, and the wire harness can be properly protected.

Further, the retaining portion is formed at the first protector, and the engagement portion for engagement with the retaining portion is formed at the second protector. Therefore, the two protectors, connected together, are prevented from being accidentally disengaged from each other by vibrations and an impact during the travel of the vehicle. Therefore, the harness protector is enhanced in interconnecting reliability, and can positively prevent the wire harness from external interference and so on.

Further, the retaining portion is the retaining projection, and the engagement portion is the hole. Therefore, the moldability of the second protector which is the extruded member is enhanced, and besides the hole, serving as the engagement portion, can be formed with a simple method.

Further, the first protector includes the base, and the cover detachably attached to the base, and therefore before installing the wire harness, the wire harness does not need to be beforehand passed through the first protector, and besides the first protector can be mounted on an intermediate portion of the wire harness. Therefore, the efficiency of the operation for mounting the first protector on the wire harness is enhanced.

Further, the support wall for supporting the wire harness in upwardly spaced relation to the wall portion of the base is formed on this wall portion, and therefore the wire harness is prevented from contacting the cut portion of the second protector cut into a predetermined length. Therefore, the wire harness is prevented from damage.

Further, the wire fixing portion is formed on and depends from the wall portion of the cover, and therefore when the cover is fitted on the base, the wire harness, passed through the base, is held by the wire fixing portion of the cover. Therefore, the wire harness is prevented from being moved and lifted within the base.

Further, the vehicle body mounting portion is provided at the first protector, and therefore the wire harness can be fixed to the vehicle body-side (such as a vehicle body panel) against movement. Therefore, the production of abnormal sounds due to fluttering of the wire harness, as well as the production of abnormal sounds due to the striking of the harness protector against the vehicle body, can be prevented.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of the present invention will now be described in detail with reference to the drawings.

Figure 1:
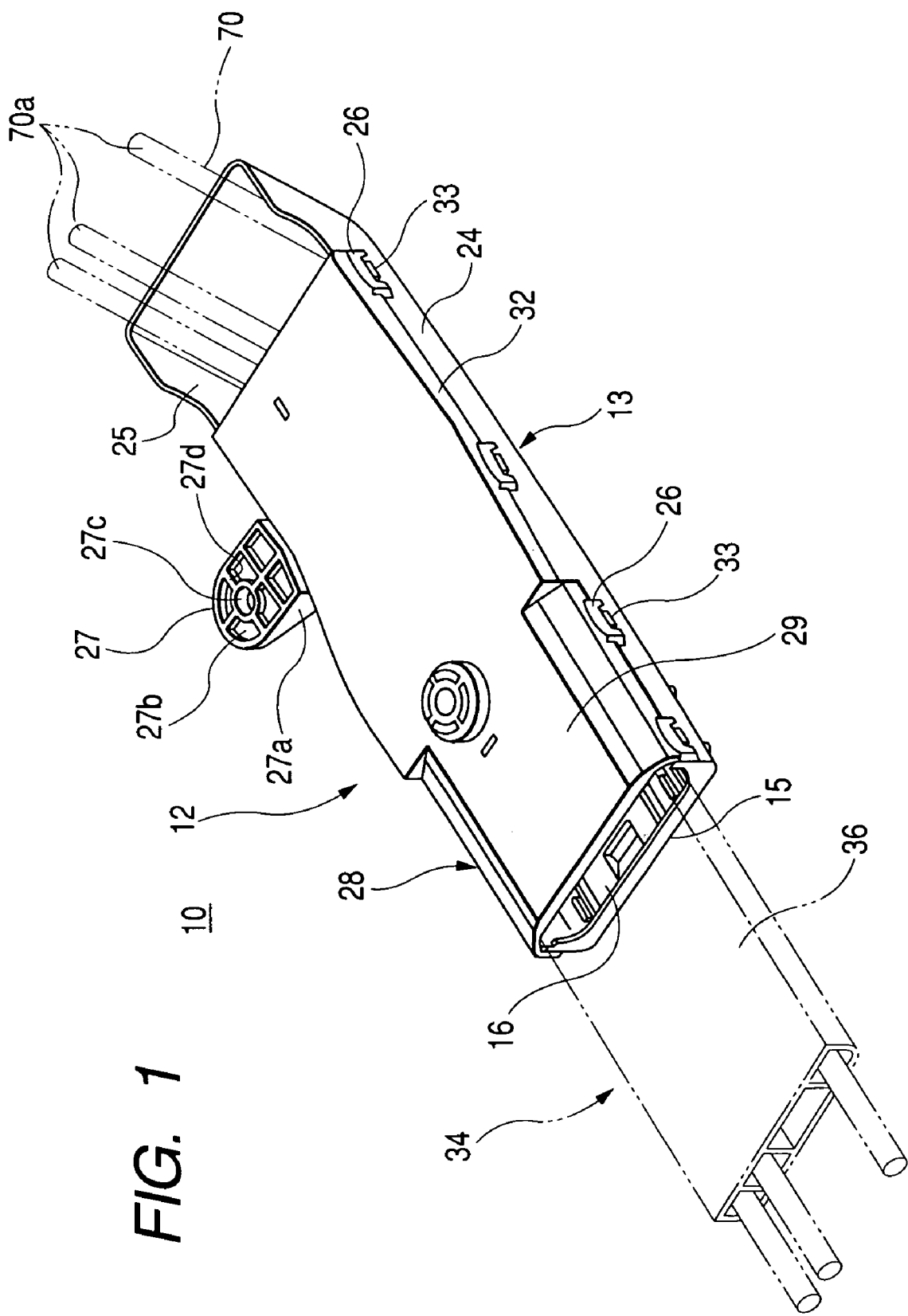
FIG. 1 is a perspective view showing one preferred embodiment of a harness protector of the present invention.

FIG. 1 shows one preferred embodiment of a harness protector of the present invention.

The harness protector is a protective member which is mounted on an interference portion of a wire harness 70 installed along a vehicle body panel or the like, and prevents the wire harness 70 from cutting, damage, etc. The harness protector is molded of a synthetic resin such as polyethylene and polypropylene. The wire harness 70 includes a bundle of electric wires for supplying electric power to actuators (such as a motor) and measuring instruments (such as a meter) or for transmitting signals, a bundle of optical fibers or a bundle of other wire-like members.

The harness protector 10 of this embodiment can properly protect a required portion of the wire harness 70 from external interference and so on by changing the longitudinal dimension of the protector. The wire harness 70 can be prevented from damage resulting from the rubbing of an end portion of the protector against the wire harness. A first feature of the harness protector 10 is that this harness protector 10 includes an injection-molded female protector (first protector) 12 and an extruded male protector (the second protector) 34 which are fitted together to be connected together, and a plurality of retaining projections (retaining portions) 20 and 31 for maintaining the two protectors 12 and 34 in a fitted condition, as well as a mounting bracket (vehicle body mounting portion) 27 for fixing to a vehicle body panel (vehicle body) (not shown), are formed on the female protector 12, and a plurality of holes (engagement portions) 37 for engagement respectively with the plurality of retaining projections 20 and 31 are formed in the male protector 34.

A second feature of this harness protector is that the female protector 12 includes a base 13, and a detachable cover 28, and a support wall 18 for supporting the wire harness 70 in upwardly spaced relation to a base wall (wall portion) 15 of the base 13 is formed on the base wall 15, and holder ribs (wire fixing portions) 30 for holding the wire harness 70, passed through the base 13, are formed on and depend from a top wall (wall portion) 29 of the cover 28.

According to the first feature, the male protector 12 is the injection-molded product, and therefore although the cost, required for a molding machine and a mold, is high, the molded product of a complicated shape can be highly precisely formed, and the wire fixing structure and the structure for mounting the protector on the vehicle body panel can be incorporated in this molded product. And besides, the female protector 12 can be molded into a shape corresponding to the shape of installation of the wire harness 70. On the other hand, the male protector 34 is the extruded product, and therefore an elongate molded member 75 of a uniform cross-section is cut into an arbitrary length to provide the male protector 34, and this male protector 34 is connected to the female protector 12, and by doing so, the length of the harness protector 10 can be increased and decreased. The two protectors 12 and 34 are locked to each other by a retaining member including the retaining projections 20 and 31 and the holes 37, so that the protector-fitted condition is maintained.

Incidentally, an injection-molding method is carried out, using an injection-molding machine, and a molten resin is injected at high pressure into a mold, and the molten resin is cooled and solidified within the mold, and the mold is opened, and the molded product is taken out of the mold. This method has a feature that molded products of a complicated shape can be produced in a large amount although the cost for the mold is high. Extrusion molding is a method in which a resin is continuously extruded by the use of an extrusion molding machine, thereby forming a molded product such as a pipe. In this method, a molten resin within a cylinder (barrel) is extruded by a screw, and is poured into a die corresponding in shape to the molded product, and is cooled to be solidified by water or the air. This method has features that the cost for facilities is low and that elongate molded members of a simple shape can be formed in a large amount.

According to the second feature, the cover 28 can be detachabley attached to the base 13 of the female protector 12, and therefore after the operation for installing the wire harness 70 is effected, the female protector 12 can be mounted on the wire harness, and therefore the efficiency of the operation for mounting the female protector 12 is enhanced. And besides, the wire harness 70 is supported in upwardly spaced relation to the base wall 15 of the base 13 by the support wall 18 formed on the base wall 15, and the wire harness 70 is prevented from damage resulting from the rubbing of a sharp edge of a cut portion 38 of the male protector 34 against the wire harness. The wire harness 70, passed through the base 13, is held from the upper side by the holder ribs 30 depending from the top wall 29 of the cover 28, and therefore the wire harness 70 is positively fixed against movement within the female protector 12.

The main constituent portions of the harness protector 10, as well as their operations, will be described below in detail.

As shown in FIG. 1, the harness protector 10 includes the injection-molded female protector 12, and the extruded male protector 34, and the two protectors are connected together by the retaining means. The wire harness 70 is passed through the interior of the harness projector 10, and a required portion of this wire harness is protected from external interference.

The female protector 12 includes the resin-molded base 13 and the resin-molded cover 28. The base 13 has a U-shaped cross-section defined by the base wall 15 and right and left side walls 24 and 25 extending upright respectively from opposite side edges of the base wall 15. An upper side, opposed to the base wall 15, and front and rear sides, spaced from each other in the longitudinal direction, are open. In this specification, for description purposes, the front sides of the protectors 12 and 34 are those sides at which the two protectors are fitted together, and the rear side of each protector is that side from which the wire harness 70 extends outwardly. The upper side is that side where the cover 28 is located, and the lower side is that side where the base 13 is located.

The base 13 is molded generally into a straight form as a whole, but a rear portion of the base 13 is slanting slightly upwardly. The rear portion of the base 13 is not covered with the cover 28, and the wire harness 70, extending outwardly therefrom, can be freely bent to a certain degree. As described above, the base 13 is the injection-molded member, and therefore the base 13 is not limited to the shape of this embodiment, but can be molded into a two- or three-dimensionally curved shape.

A plurality of retaining frame portions 26 for retaining the cover 28 are formed on the right and left side walls 24 and 25. Each retaining frame portion 26 includes opposite proximal end portions, and a free end portion extending from the proximal end portions, and is allow to be elastically deformed slightly. Retaining claws 33 (FIG. 3) are formed on edge walls 32 of the cover 28, and are so disposed as to correspond respectively to the retaining frame portions 26. When the cover 28 is fitted on the base 13, each retaining claw 33 elastically deforms the corresponding retaining frame portion 26, and then is inserted thereinto, and when the free end portion is elastically restored, the retaining claw 33 is engaged with the retaining frame portion 26.

The mounting bracket 27 for fixing the harness protector 10 to the vehicle body panel is formed on and projects from one side wall 25. The mounting bracket 27 has a tongue-like shape, and projects in a direction perpendicular to the side wall 25. Such a mounting bracket 27 can be formed by injection molding, but can not be formed by extrusion molding.

The mounting bracket 27 includes opposite proximal end portions 27a, and a mounting portion 27b extending from the proximal end portions 27a. A screw hole 27c for the passage of a screw (which is not shown, and serves as a fastening element) therethrough is formed through a central portion of the mounting portion 27b. Radial reinforcing ribs 27d are formed around the screw hole 27c, and are disposed at equal intervals in a circumferential direction. The mounting portion 27b are reinforced by the reinforcing ribs 27d to have an increased strength, so that the harness protector 10 can be firmly fastened and fixed to the vehicle body panel through the mounting bracket 27.

Figure 2:
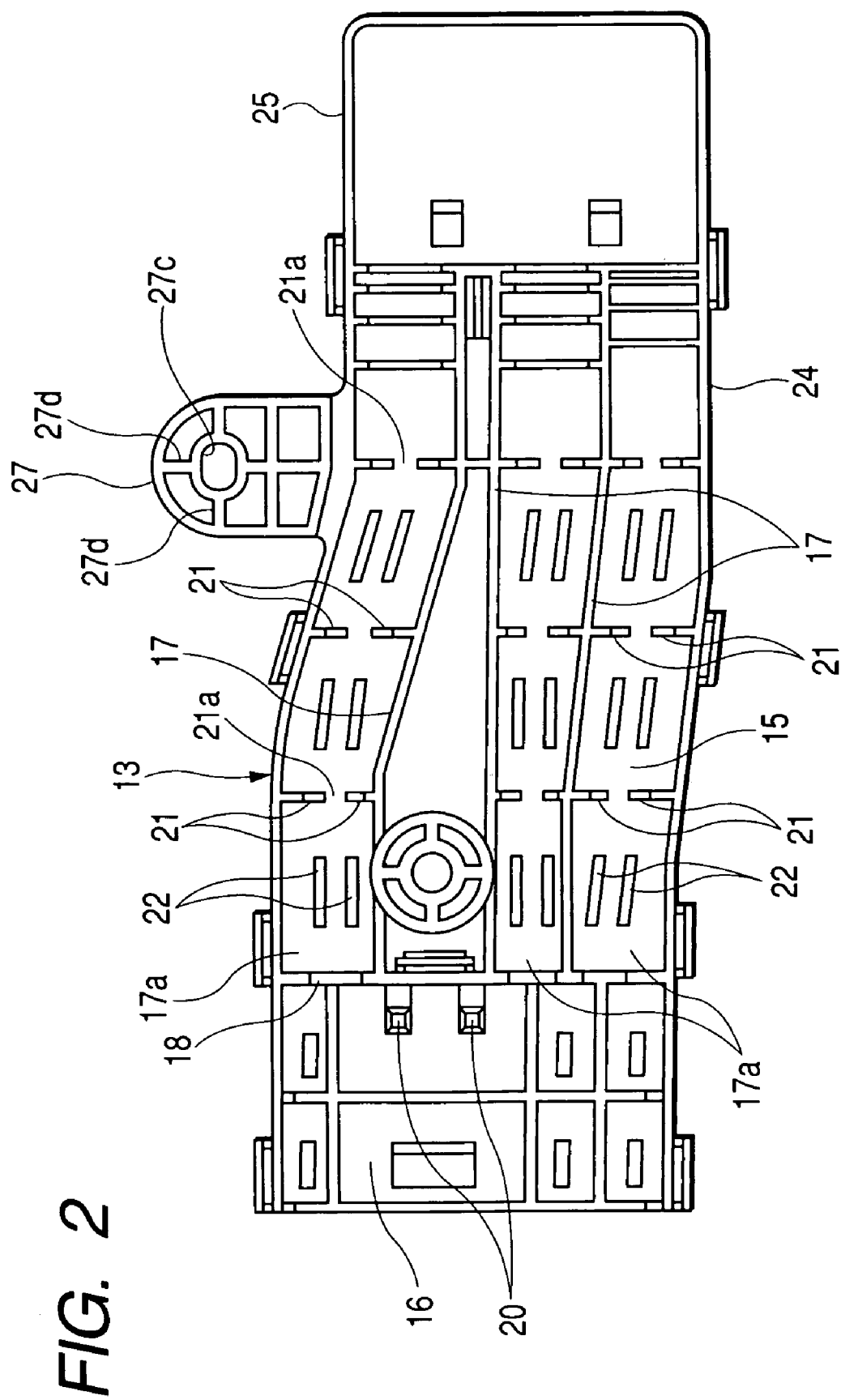
FIG. 2 is a plan view of a base of a female protector shown in FIG. 1.

As shown in FIG. 2, a plurality of partition walls 17 for dividing the wire harness 70 into wires 70a constituting this wire harness 70, the support wall 18 intersecting front ends of the partition walls 17, transverse ribs 21 formed on predetermined portions of the partition walls 17 and the side walls 24 and 25 (the ribs 21, formed on each of these walls, are spaced from each other in the longitudinal direction), and a plurality of longitudinal ribs 22 (extending long in the longitudinal direction) are formed on the base wall 15.

The partition walls 17 are formed on an intermediate portion of the base wall 15 between the front and rear portions thereof, and extend along the length of the wires 70a (FIG. 1). Passageways 17a for respectively passing the wires 70a therethrough are formed between the right side wall 24 and the adjacent partition wall 17, between the two adjacent partition walls 17 and between the partition wall 17 and the left side wall 25, respectively. The wires 70a are thus passed through the passageways 17a, respectively, and by doing so, the wires 70a are prevented from being entangled with each other. The plurality of transverse ribs 21 are formed in a projected manner in each passageway 17a, and therefore the side walls 24 and 25 and the partition walls 17 are reinforced, and are prevented from falling. Each wire 70a is passed through slots 21a each formed between the opposed transverse ribs 21, and therefore by narrowing the width of these slots, each wire 70a is prevented from lateral displacement.

The longitudinal ribs 22 are arranged in two rows in each passageway 17a, and therefore the wire 70a is supported by the longitudinal ribs 22. Each wire 70a is supported by the longitudinal ribs 22 in upwardly spaced relation to the base wall 15, and therefore a heat-radiating effect for each wire 70a is enhanced, so that heat is prevented from residing in the female protector 12.

Figure 4:
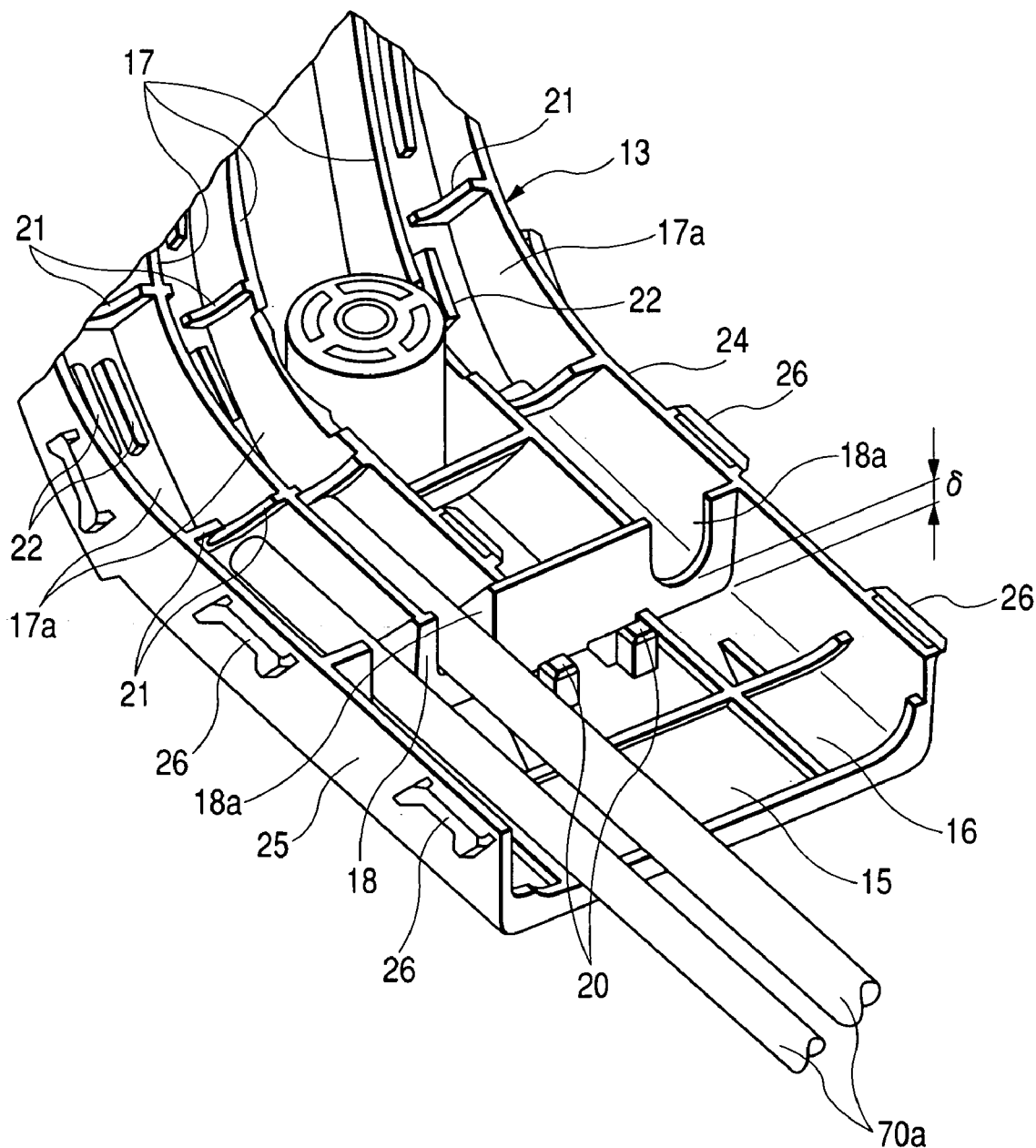
FIG. 4 is a perspective view showing a fitting receiving portion of the base shown in FIG. 2.

As shown in FIG. 4, the support wall 18 is provided at a rear side of a fitting receiving portion 16 into which a fitting portion 35 (FIG. 6) of the male protector 34 can be inserted. U-shaped passage ports 18a for respectively passing the three wires 70a therethrough are formed in the support wall 18. Each passage port 18a is located to communicate with the corresponding passageway 17a, and is so formed as to support the wire 70a in upwardly spaced relation to the base wall 15.

A height δ from the base wall 15 to a bottom of the passage port 18a is generally equal to or larger than a wall thickness t (FIG. 5) of the male protector 34, and therefore each wire 70a is prevented from contacting the sharp edge of the cut portion 38 (FIG. 5) of the male protector 34. Therefore, even when the wire harness 70 is displaced in the longitudinal direction upon application of an accidental pulling force thereto, the wires 70a will not be damaged, and are prevented from undergoing rubbing marks.

Each passage port 18a in the support wall 18 is generally equal to or slightly narrower than the outer diameter of the wire 70a, and therefore the wire 70a is gripped by an inner edge of the passage port 18a, and the wire 70a is prevented from withdrawal during the wire-passing operation, so that the efficiency of the operation is enhanced.

The support wall 18 is disposed perpendicular to the protector-fitting direction, and is formed at the rear side of the fitting receiving portion 16, and therefore when the two protectors 12 and 34 are in the fitted condition, the support wall also performs the function of preventing sand, dust, dirt, water, etc., from intruding into the interior of the base 13 through the opening thereof.

The pair of retaining projections 20 are formed on and project inwardly from the base wall 15 at the fitting receiving portion 16. The holes 37 are formed through a peripheral wall 36 of the male protector 34 so as to correspond respectively to the retaining projections 20. When the retaining projections 20 are engaged respectively in the holes 37, the fitted condition of the two protectors 12 and 34 is maintained.

Figure 3:
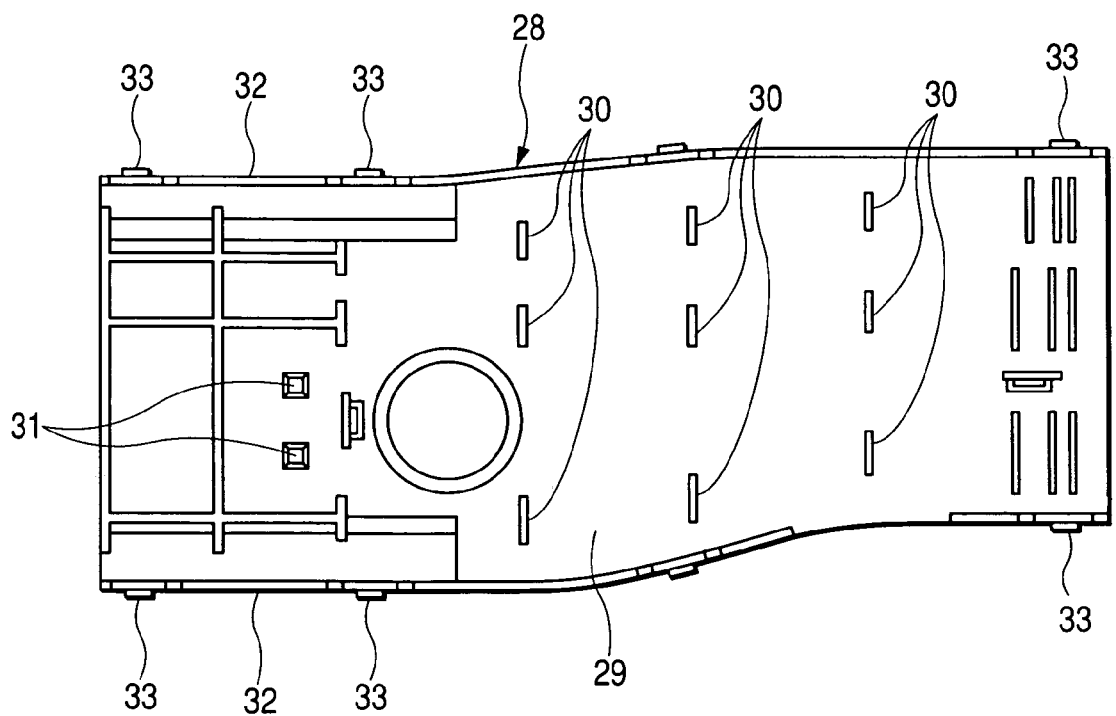
FIG. 3 is a bottom view of a cover of the female protector shown in FIG. 1.

As shown in FIG. 3 (which shows the reverse side of the cover 28), the cover 28 is formed into a shape corresponding to the shape of the upper side (opening) of the base 13. The cover 28 includes the top wall 29, and the edge walls 32 formed respectively at opposite (right and left) side edges of the top wall 29. The plurality of retaining claws 33, corresponding respectively to the retaining frame portions 26 of the base 13, are formed on the edge walls 32. When the retaining claws 33 are engaged respectively with the retaining frame portions 26, the base 13 is attached to the cover 28. For removing the cover 28 from the base 13, the retaining frame portions 26 are elastically deformed outwardly, so that the retaining claws 33 can be brought out of retaining engagement with the retaining frame portions 26, respectively.

The plurality of holder ribs 30 for holding the wires 70a passed through the base 13 are formed on the top wall 29. The holder ribs 30 are so arranged as to correspond respectively to the slots 21a (FIG. 2) each formed between the opposed transverse ribs 21 in the passageway 17a of the base 13. When the wires 70a are passed through the base 13, and the cover 28 is attached to the base 13, the wires 70a are held by the holder ribs 30, and are prevented from moving and fluttering.

The pair of retaining projections 31 are formed on and project inwardly from the front portion of the cover 28 which forms the fitting receiving portion 16 when the cover 28 is fitted on the base 13. The retaining projections 31 are so disposed as to correspond respectively to the holes 37 formed through the peripheral wall 36 of the male protector 34, and when the retaining projections 31 are engaged respectively in the holes 37, the fitted condition of the two protectors 12 and 34 is maintained. In this embodiment, the retaining projections 20 are formed on the base 13 while the retaining projections 31 are formed on the cover 28, and therefore the two protectors 12 and 34 can be positively locked to each other.

Figure 5:
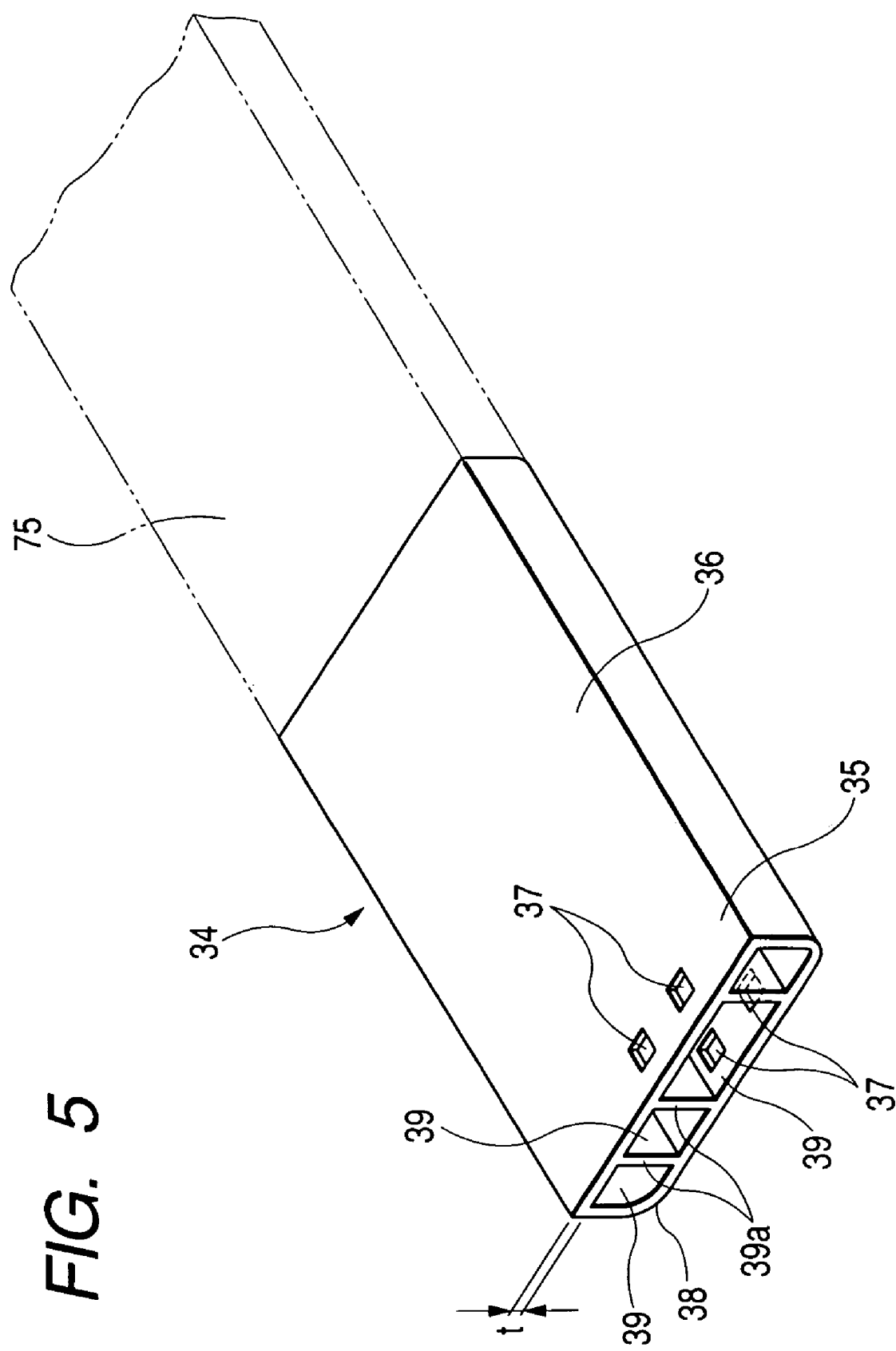
FIG. 5 is a perspective view of a male protector shown in FIG. 1.
Figure 6:
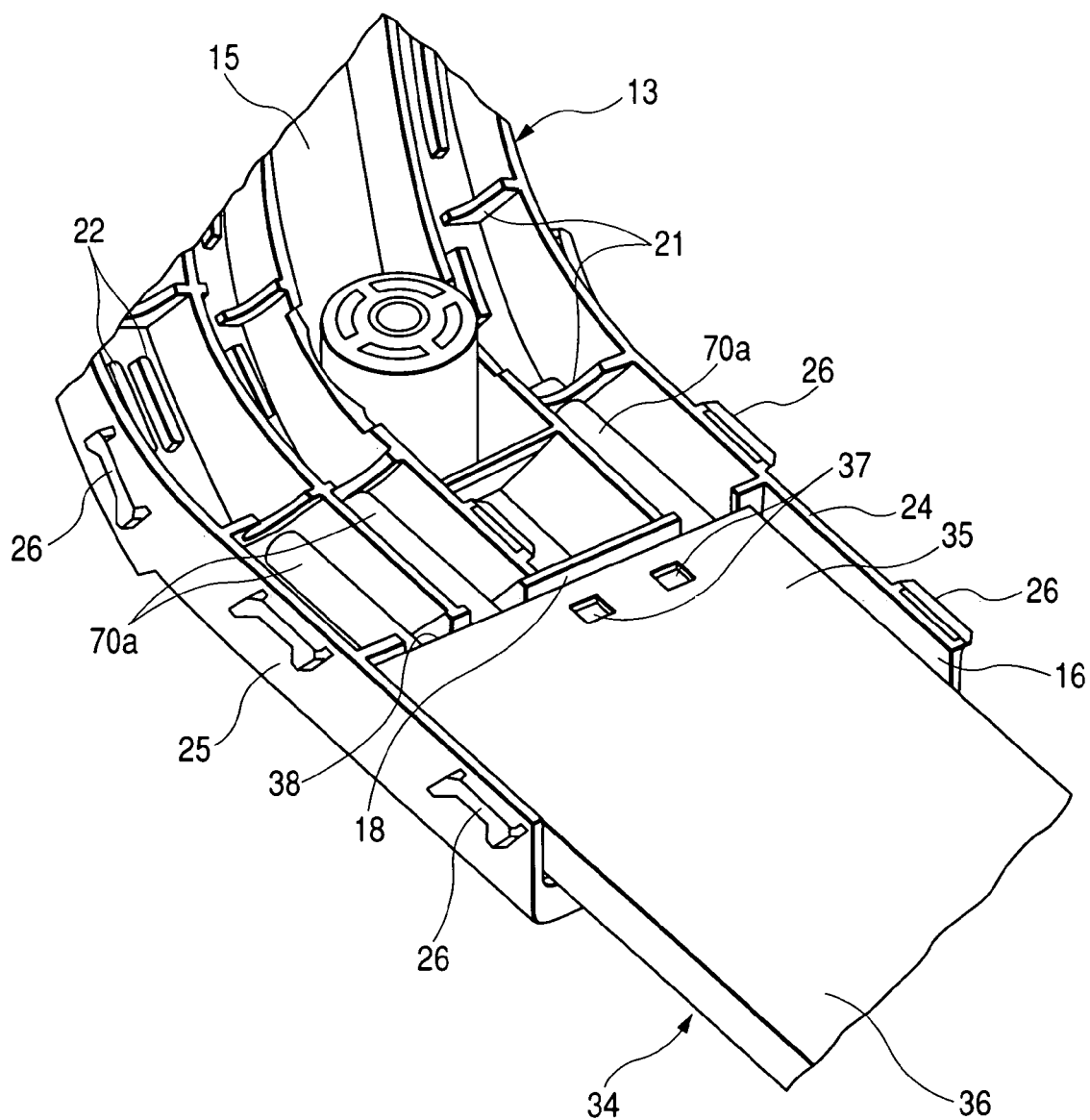
FIG. 6 is a perspective view showing a condition in which the male protector of FIG. 5 is fitted in the base of the female protector shown in FIG. 2.
Figure 7:
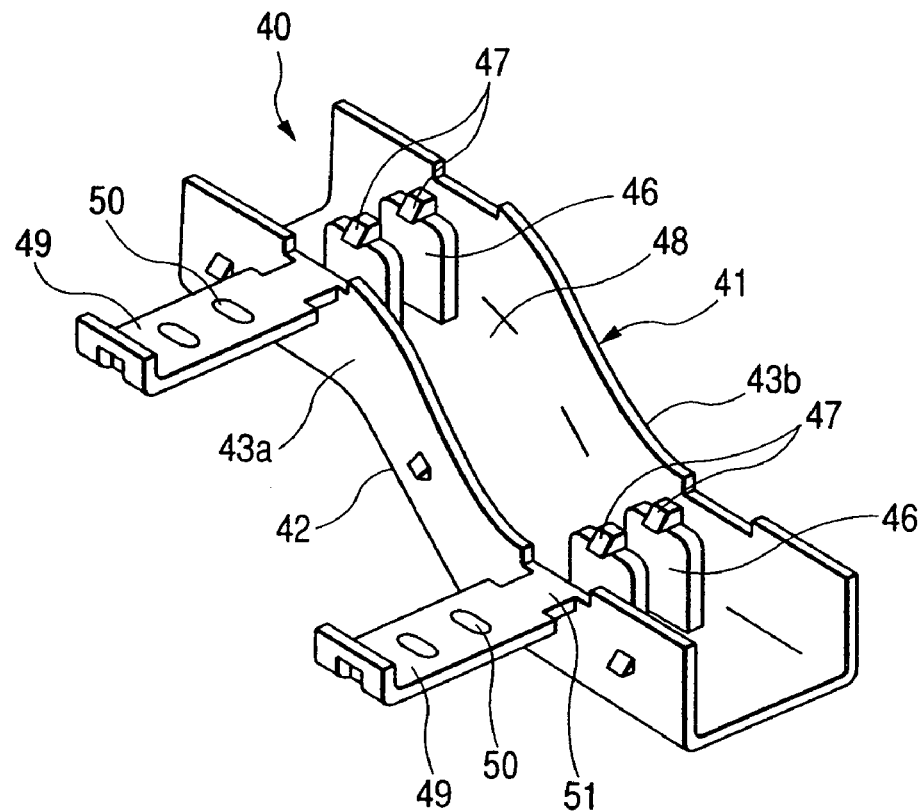
FIG. 7 is a perspective view showing the first related harness protector.
Figure 8:
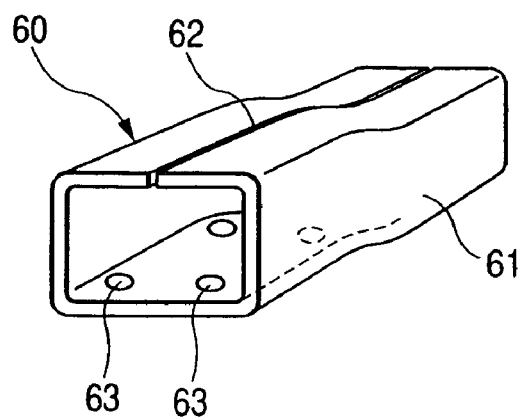
FIG. 8 is a perspective view showing the second related harness protector.

The male protector 34, shown in FIGS. 5 and 6, is cut from the elongate pipe-like molded member 75 formed by extrusion. The male protector has a uniform cross-section over the entire length thereof. The cutting of the elongate molded member is carried out by the use of a tool such as a cutter having a high cutting quality, and therefore the cutting can be effected quite sharply without inviting the forcible shearing, fusion, etc. On the other hand, there is a fear that when the wire 70a contacts the edge, the wire 70a is damaged. In the invention, taking such a circumstance into consideration, the wires 70a are supported in upwardly spaced relation to the base 13 by the support wall 18 formed on the base 13, and by doing so, the wires 70a are prevented from contacting the sharp edge of the male protector 34.

The holes 37 for engagement respectively with the retaining projections 31 on the cover 28 are formed through the upper portion of the peripheral wall 36, while the holes 37 for engagement respectively with the retaining projections 20 on the base 13 are formed through the lower portion of the peripheral wall 36. The number of the formed holes 37 is equal to the number of the retaining projections 20 and 31. For locking the female protector 12 and the male protector 34 to each other, the male protector 34 is attached to the base 13 from which the cover 28 is removed, and the holes 37, formed through the lower wall of the male protector 34, are engaged respectively with the retaining projections 20 of the base 13, and then the cover 28 is attached to the base 13, and the retaining projections 31 of the cover 28 are engaged respectively in the holes 37 formed through the upper wall of the male protector 34. When the two protectors 12 and 34 are thus locked together, the two protectors 12 and 34 will not be disengaged from each other by vibrations during the travel of the vehicle and an accidental pulling force, so that the interconnecting reliability of the harness protector 10 is maintained.

Passage holes 39 for respectively passing the wires 70a therethrough in such a manner that the wires 70a are arranged in a row are formed within the male protector 34. Any two adjacent passage holes 39 are separated by a partition wall 39a. Unlike the female protector 12, any wire fixing means is not incorporated in the passage hole 39, and therefore each wire 70a can be freely slid in and along the passage hole 39. However, when the male protector 34 is connected to the female protector 12, each wire 70a is fixed.

In the present invention, the following modifications can be made without departing from the subject matter of the invention.

(1) Each of the female protector 12 and the male protector 34 is molded into a pipe-like shape, and a fitting interference (interference) is provided between the female protector 12 and the male protector 34, and the two protectors are connected together by press-fitting or forcible fitting so that the two will not be disengaged from each other, thus maintaining the fitted condition. With this construction, the retaining projections 20 and 31 and the holes 37 do not need to be formed at the female and male protectors 12 and 34, and therefore the moldability of the two protectors 12 and 34 is enhanced, and also the interconnecting ability is enhanced.

(2) Instead of forming the retaining projections 20 and 31 on the base 13 and the cover 28, the retaining projections 20 (or 30) are formed on the base 13 (or the cover 28). With this construction, the protector, having no retaining projection 20 or 31, is enhanced in moldability, and the production cost can be reduced.

(3) Each of the retaining projections 20 on the female protector 12 is changed into a convex portion, while each of the holes 37 in the male protector 34 is-changed into a concave portion. Alternatively, such concave portions are formed at the female protector 12 while the convex portion are formed at the male protector 34. With this construction, by engaging the convex portions respectively in the concave portions, the two protectors 12 and 34 can be easily locked to each other.

(4) The first protector is changed to an injection-molded male protector while the second protector is changed to an extruded female protector. With this construction, the wires 70a will not contact a cut portion (fitting end) of the female protector without providing the support wall for supporting the wires 70a in an upwardly-spaced condition, and therefore the wires 70a are prevented from damage.

What is claimed is:

1. A harness protector, comprising:
a first protector having a first end and a second end, which is opposite to the first end, in a longitudinal direction of the first protector; and
a second protector having a third end and a fourth end, which is opposite to the third end, in a longitudinal direction of the second protector;
wherein the third end of the second protector is engaged with the first end of the first protector so that the longitudinal direction of the first protector is substantially the same as the longitudinal direction of the second protector;

wherein the first end is situated closer to the third end than the fourth end; and wherein the second end is situated closer to the third end than the fourth end.

2. The harness protector according to claim 1, wherein the first protector has a retaining portion; and wherein the second protector has an engagement portion for engagement with the retaining portion.

3. The harness protector according to claim 2, wherein the retaining portion is a retaining projection; and wherein the engagement portion is a hole.

4. The harness protector according to claim 1, wherein the first protector includes a base member and a cover member which is detachably attached to the base member.

5. The harness protector according to claim 4, wherein a support wall which supports a wire harness so that the wire harness is spaced from a wall portion of the base member is formed on the wall portion; and wherein a height of the support wall is generally equal to or greater than a wall thickness of the second protector.

6. The harness protector according to claim 4, wherein a wire fixing portion which holds a wire harness arranged on the base member is formed on a wall portion of the cover member.

7. The harness protector according to claim 1, wherein a vehicle body mounting portion for fixing to a vehicle body is provided on the first protector.

8. The harness protector according to claim 7, wherein said vehicle body mounting portion has a tongue shape and extends perpendicularly from a side wall of at least one of said first protector and said second protector.

9. The harness protector according to claim 1, wherein the first protector has a first containing portion in which a wire harness is passed through;

wherein the second protector has a second containing portion in which the wire harness is passed through; and wherein when the first protector and the second protector is are connected together, the first containing portion and the second containing portion are communicated each other.

10. The harness protector according to claim 1, wherein the second protector is slidably engaged with the first end of said first protector.

11. The harness protector according to claim 10, wherein said first protector and said second protector are connected together by an interference fit.

12. The harness protector according to claim 1, further comprising a third protector with a fifth end and a sixth end, which is opposite to the fifth end, in a longitudinal direction of the third protector;

wherein the fifth end of the third protector is engaged with the second end of said first protector; and wherein the fifth end and the sixth end of the third protector are closer to the second end of the first protector than the first end of the first protector.

13. The harness protector according to claim 12, wherein a rear portion of said first protector is slanted.

14. The harness protector according to claim 13, wherein said vehicle body mounting portion includes reinforcing ribs.

15. The harness protector according to claim 1, further comprising a wire harness in said harness protector;

wherein a first portion of said wire harness disposed in said first protector is bent and a second portion of said wire harness disposed in said second protector is substantially straight.

16. The harness protector according to claim 1, wherein said second protector has a uniform cross-section over its entire length.

17. The harness protector according to claim 1, wherein said first protector has a wire harness fixing portion fixing a wire harness.

18. The harness protector according to claim 1, wherein the second protector extends from the first protector in the longitudinal direction of the first protector so as to increase an overall length of the harness protector;

wherein a wire harness is disposed in the harness protector; and wherein the wire harness has a first portion which is disposed only in the first protector and a second portion which is disposed only in the second protector.

* * * * *